(12) United States Patent  (10) Patent No.: US 8,504,114 B1
Tseng  (45) Date of Patent: Aug. 6, 2013

(54) INTELLIGENT NOTIFICATIONS WITH DYNAMIC ESCALATIONS

(75) Inventor: Erick Tseng, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 12/960,097

(22) Filed: Dec. 3, 2010

(51) Int. Cl.
*H04M 1/00* (2006.01)

(52) U.S. Cl.
USPC ......... 455/567; 455/418; 455/550.1; 709/226

(58) Field of Classification Search
USPC .................. 455/567, 418, 550.1; 709/226
See application file for complete search history.

(56) References Cited

U.S. PATENT DOCUMENTS

| 2007/0036300 A1 | 2/2007 | Brown et al. |
| 2008/0153503 A1 | 6/2008 | Birla et al. |
| 2009/0198786 A1* | 8/2009 | Iemura ............................ 709/207 |
| 2009/0249247 A1 | 10/2009 | Tseng et al. |
| 2009/0325607 A1 | 12/2009 | Conway et al. |
| 2012/0028689 A1* | 2/2012 | Fujii et al. ...................... 455/567 |

* cited by examiner

*Primary Examiner* — Danh Le
(74) *Attorney, Agent, or Firm* — Shumaker & Sieffert, P.A.

(57) ABSTRACT

A method includes executing instructions recorded on a non-transitory computer-readable storage media using at least one processor. The method includes receiving, at a device, at least two communications from a sender of the communications using at least two different communication modes, determining a notification mode for the device based on an identity of the sender and at least two of the communication modes being different from one another and providing a notification on the device using the determined notification mode.

15 Claims, 11 Drawing Sheets

INTELLIGENT NOTIFICATIONS WITH DYNAMIC ESCALATIONS

TECHNICAL FIELD

This description relates to systems and techniques for intelligent notifications with dynamic escalations.

BACKGROUND

More and more, people use mobile communication devices to communicate with various family, friends and acquaintances. For example, people use mobile communication devices to make and receive telephone calls, send and receive electronic mail, send and receive text and other types of messages, and browse the web.

When messages come in or when other events occur on a mobile device, it is customary for the device to make a noise signaling the event. Such an action derives from traditional telephones, which ring when someone is calling. Such rings can now be customized depending on the identity of the caller for the incoming call. Also, a device may be switched to vibrate mode when silence is desired, such as at a meeting, a movie, or a play. For other sorts of incoming messages, such as e-mails, or for other events, the device may beep, vibrate, or provide some other form of alert.

SUMMARY

According to one general aspect, a method includes executing instructions recorded on a non-transitory computer-readable storage media using at least one processor. The method includes receiving, at a device, at least two communications from a sender of the communications using at least two different communication modes, determining a notification mode for the device based on an identity of the sender and at least two of the communication modes being different from one another and providing a notification on the device using the determined notification mode.

Implementations may include one or more of the following features. For example, determining the notification mode may include determining the notification mode for the device based also on a frequency of the communications. Determining the notification mode may include determining the notification mode for the device based also on a period of time between a change in the communication mode. Determining the notification mode may include changing the notification mode from a non-audible notification mode and providing the notification may include providing an audible notification using an audible notification mode. Determining the notification mode may include determining the notification mode for the device based also on an importance group of the sender. The method may further include increasing a frequency of the notification on the device using the determined notification mode. The method may further include allowing a user of the device to configure the notification modes.

In another general aspect, a recordable storage medium has recorded and stored thereon instructions that, when executed, perform the actions of receiving, at a device, at least two communications from a sender of the communications using at least two different communication modes, determining a notification mode for the device based on an identity of the sender and at least two of the communication modes being different from one another and providing a notification on the device using the determined notification mode.

Implementations may include one or more of the following features. For example, the instructions that, when executed, perform the action of determining the notification mode may include instructions that, when executed, perform the action of determining the notification mode for the device based also on a frequency of the communications. The instructions that, when executed, perform the action of determining the notification mode may include instructions that, when executed, perform the action of determining the notification mode for the device based also on a period of time between a change in the communication mode. The instructions that, when executed, perform the action of determining the notification mode may include instructions that, when executed, perform the action of changing the notification mode from a non-audible notification mode and the instructions that, when executed, perform the action of providing the notification may include instructions that, when executed, perform the action of providing an audible notification using an audible notification mode. The instructions that, when executed, perform the action of determining the notification mode may include instructions that, when executed, perform the action of determining the notification mode for the device based also an importance group of the sender.

The recordable storage medium may further include instructions that, when executed, perform the action of increasing a frequency of the notification on the device using the determined notification mode. The recordable storage may further include instructions that, when executed, perform the action of allowing a user of the device to configure the notification modes.

In another general aspect, an apparatus includes a processor, a memory that is operably coupled to the processor, a wireless interface that is operably coupled to the processor and that is arranged and configured to receive, at the apparatus, at least two communications from a sender of the communications using at least two different communication modes and a notification manager that is operably coupled to the processor and that is arranged and configured to determine a notification mode for the device based on an identity of the sender and at least two of the communication modes being different from one another and provide a notification on the apparatus using the determined notification mode.

Implementations may include one or more of the following features. For example, the notification manager may be arranged and configured to determine the notification mode for the device based also on a frequency of the communications. The notification manager may be arranged and configured to determine the notification mode for the device based also on a period of time between a change in the communication mode. The notification manager may be arranged and configured to change the notification mode from a non-audible notification mode and provide an audible notification using an audible notification mode. The notification manager may be arranged and configured to determine the notification mode based also on an importance group of the sender. The notification manager may be further arranged and configured to increase a frequency of the notification on the device using the determined notification mode.

The apparatus may further include an input interface that is operably coupled to the processor and that is arranged and configured to allow a user of the device to configure the notification modes.

The details of one or more implementations are set forth in the accompanying drawings and the description below. Other features will be apparent from the description and drawings, and from the claims.

DETAILED DESCRIPTION

Figure 1A:
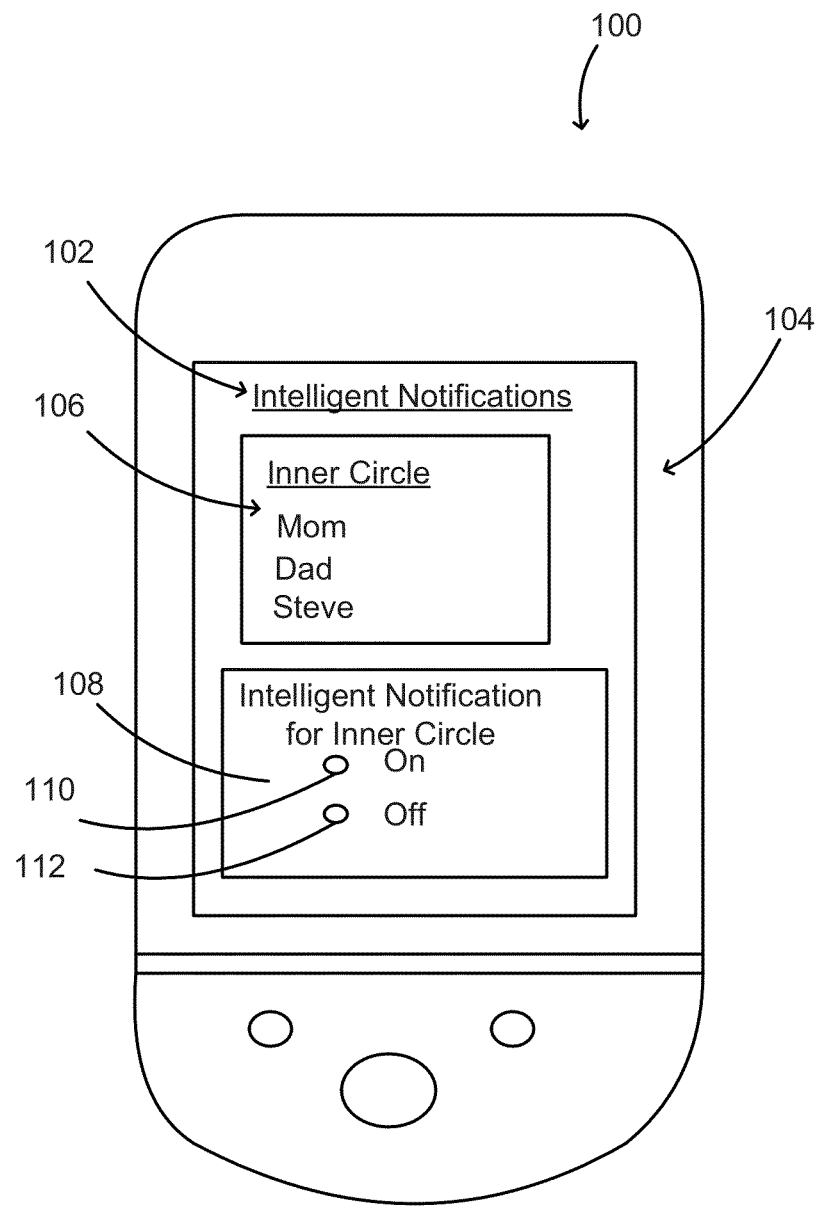
FIGS. 1A and 1B are schematic representations of an exemplary device illustrating an interface on the device for intelligent notifications.

This document describes systems and techniques that may be used to alert a user of a mobile device about an event, such as about the presence of a recently received communication, e.g., an email, social network posting, voice mail, text message, or telephone call received from a sender using multiple different modes of communication. The mobile device may include multiple different notification modes, which may be used to alert the user of the mobile device of an incoming communication. The notification modes may include audible (e.g., beeps, rings, musical snippets or other noises) and non-audible (e.g., vibrate or blinking light) modes. The notification mode is selected based on an identity of a single sender of the communications using at least two different communication modes. In this manner, the device is configured to provide different types of notifications depending on who is contacting the device and a perceived urgency of the communications. For example, a change in communication modes by the single sender may be an indication of urgency of the incoming communications. A notification mode can include a number of different notification cues, e.g., rings, vibrations, lights, images, or other indications that a communication is being received by the device.

Intelligent notifications refers to the selection of the notification mode based on an identity of a single sender of the communications using at least two different communication modes and the providing of the notification on the device using the selected notification mode. The selection of the notification mode also may be based on a frequency of the communications, a period of time between a change in communication modes, an importance group of the sender or other criteria. Intelligent notifications includes recognizing communications from a same sender, who is using at least two different communication modes to send the communications. Intelligent notifications may include, for example, a change in the notification cue (e.g., from non-audible to audible, from one audible type to a different audible type, from one non-audible type to a different non-audible type, etc.), a change in the frequency of the notification cues, a change in the volume of the notification cue (e.g., an increase in the loudness of the notification cue), multiple simultaneous notification cues, or multiple successive notification cues.

In some implementations, the severity or intensity of a notification cue increases as consecutive, non-responded to communications are received from a single sender. For instance, if the sender is the user's mother and she first sends one or more instant messages, the device may vibrate. If the same sender next calls, the device may change the notification mode from vibrate to a loud ring. If the device receives further calls from the same sender, the device may change the frequency of the notifications and/or may change the ring from a loud ring to a very loud, chirping ring. In this manner, the perceived urgency is based on the change of the communication mode from the instant messages to the calls and the identity of the sender, in this case the user's mother. This alerts the user that the communication is perceived to be important and that the user should respond to the communications. In this manner, the device dynamically escalates the notifications to the user, thus the escalating notifications are one type of intelligent notification.

In one exemplary implementation, a user of a device may determine various aspects related to intelligent notifications including, for example, who intelligent notifications should be applied to and the particular notification modes to use. As discussed in more detail with respect to the below descriptions of the example illustrations, the user may designate specific contacts to trigger intelligent notifications either on a group level or on an individual contact level. The user also may designate the specific notification modes or cues to be applied. For instance, intelligent notifications may apply to any designated sender who sends a communication to the user's device using at least two different communication modes.

Referring to FIG. 1A, a schematic representation of an exemplary device 100 is illustrated. The device 100 may include any type of computing device including, for example, a mobile computing device, a mobile phone, a laptop, a tablet device, a game device, a music player, a personal digital assistant, a smart phone or any combination of these devices. The device 100 may be configured to send and receive multiple different types of communications such as, for example, text messages, instant messages, chat messages, telephone calls, video messages, messages posted as part of a social networking application as well as other types of communications.

The device 100 may be configured to identify the sender of the communications and the type of communication mode used by the sender. The device also may be configured to identify when a same sender sends multiple communications using at least two different communication modes. For example, the device may use an identifier in the incoming communications to identify the sender of the communications. The communications may include an e-mail address, a telephone number, a user identifier (ID), an alias, a name, a user name or other identifier. Various identifiers can be associated with the particular sender, such as in the device contacts or in applications such as social networking applications. The identifier that is received with the communication may be mapped to one of the sender's identifiers such as in the device contacts on in another application, such as in a social networking application.

The device 100 may be configured to track a number of incoming communications from the identified senders and to track to the type of communication mode used by the sender. For example, the device 100 may track this information in a table and use the information to determine when a single sender has sent multiple communications using different communication modes.

The device 100 may include a user interface 102 as part of a display 104. The user interface 102 on the display 104 may be configured to enable a user of the device 100 to set notification modes for select contacts. The notification modes provide different types of alerts to notify a user of the device 100 of an incoming and/or a received communication. In one exemplary implementation, intelligent notifications may be used to notify the user of incoming and/or received communications from a designated sender when the sender uses at least two different communication modes to contact the user. Intelligent notifications may be alerts that change from one notification type to a different notification type based on a change in the communication mode from a designated sender.

FIG. 1A illustrates merely one example where the user of the device 100 may designate intelligent notifications to apply to specific contacts. In this example, the user of the device 100 may designate certain contacts to be part of a special group and then either turn on or turn off the intelligent notifications for everyone in the group. For example, the user interface 102 may include an "Inner Circle" window 106. The Inner Circle window 106 may be a designation for contacts to which the intelligent notifications will apply. While it is labelled Inner Circle, that is merely a label and it may be referred to by other names or labels to mean the group of contacts to which the intelligent notifications will apply. The "Inner Circle" may designate the contact as part of an importance group, separate from other non-designated contacts, that may be used as a criteria to apply intelligent notifications.

The user of the device may add contacts to the Inner Circle window 106 in different ways. For instance, the user may type contacts directly into the Inner Circle window 106, drag and drop contacts from a listing into the Inner Circle window 106 or designate the contacts as Inner Circle group members in another user interface such as directly from a contacts listing or directly from a message or other listing in which the name of the contact appears. The Inner Circle window 106 may provide a convenient display window for the user to see this group of designated contacts in a single view. The user also may remove contacts from the Inner Circle window 106. Removing a contact from the Inner Circle window 106 may not remove them from an overall contact directory, but simply remove them from being designated as a member of the Inner Circle.

In one implementation, the user of the device 100 may activate the intelligent notifications or deactivate the intelligent notifications for the entire group of members listed in the Inner Circle window 106. For instance, the Intelligent Notification interface 108 may be used to either turn on or turn off the notifications using radio buttons. When the "On" radio button 110 is selected, the intelligent notifications are turned on for all of the contacts listed in the corresponding intelligent notifications group, here shown as the Inner Circle window 106. When the "Off" radio button 112 is selected, the intelligent notifications are turned off for all of the contacts listed in the Inner Circle window 106. The intelligent notifications and various examples of intelligent notifications are discussed in more detail below with respect to FIGS. 2A-4.

In this manner, the user of the device 100 may decide who is part of the intelligent notifications group and when to apply intelligent notifications to incoming communications. For contacts who are not members of the Inner Circle window 106, default notifications may apply to incoming communications from those contacts. For example, if the device 100 is set to vibrate mode, then incoming messages from contacts who are not designated as part of the Inner Circle will cause the device 100 to vibrate, regardless of how many communications are received from a single sender. The notification may not change for those non-designated contacts even if the communications increase in frequency or change communication modes. Subsequent incoming communications will still cause the device 100 to vibrate.

With intelligent notifications turned on 110, the intelligent notifications may override the default notification mode. For example, if the device 100 is set to vibrate mode, then incoming messages from contacts who are designated as part of the Inner Circle may vibrate with the first incoming communication, but then change notification modes from vibrate to an audible notification mode if a subsequent communication comes from the same contact using a different communication mode. In this manner, the user is alerted that someone from the Inner Circle is attempting to contact him and has attempted at least once using one communications mode and is now attempting using another communications mode. The user of the device 100 is alerted that it is a member of the Inner Circle sending the communications because the notification mode changed from vibrate, which had been set as a default notification mode, to an audible notification mode.

In one exemplary implementation, the device 100 may present the user with an option to add someone to the Inner Circle. The device 100 may use one or more different criteria to determine whether or not to present the user with the option to add someone to the Inner Circle. For example, the criteria may include the frequency of communications from a sender, a change in communications modes by the sender within a given period of time (e.g., from email message, to text message, to phone call within a given period of time), and other criteria. When the criteria has been met for a particular sender, the device 100 may display a message to the user, which gives the user the option to add the particular sender to the Inner Circle. When presented with the option, the user may either add or decline to add the particular sender to the Inner Circle.

Figure 1B:
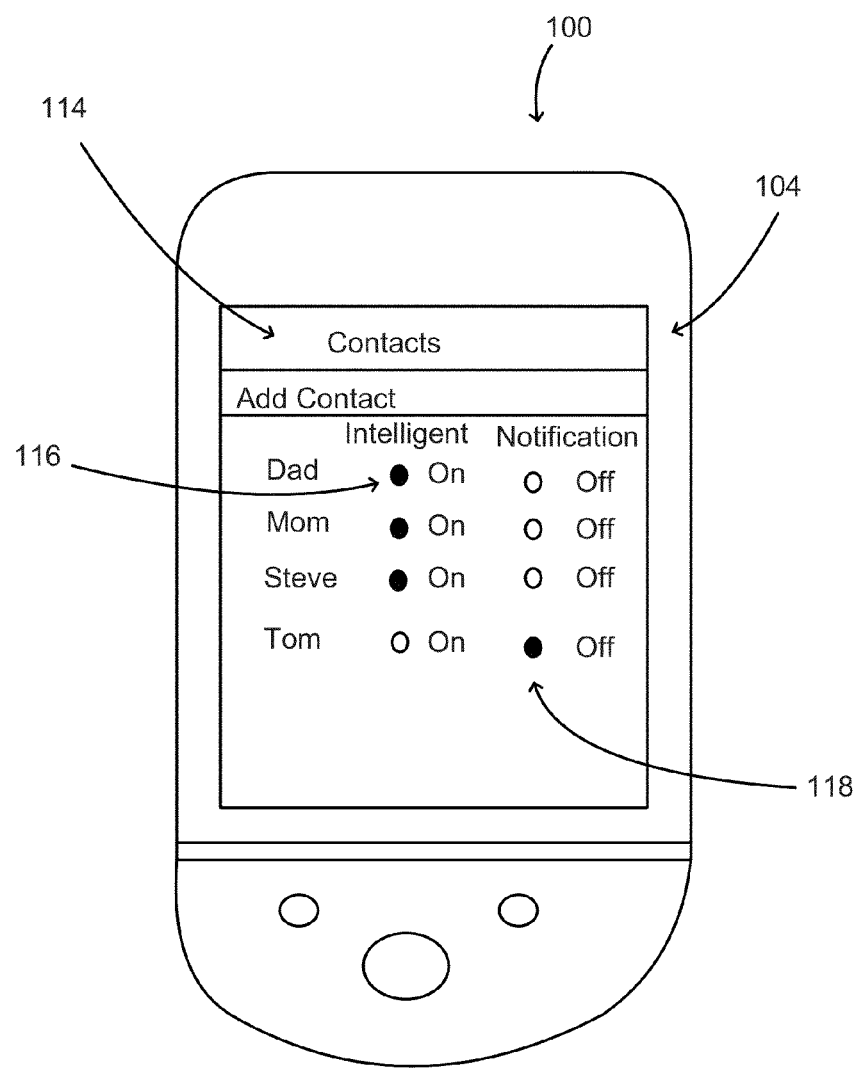

In another exemplary implementation, the user of the device 100 may turn the intelligent notifications on and off on an individual contact basis. Referring to FIG. 1B, a schematic representation of the exemplary device 100 is illustrated. In this example, the display 104 may illustrate a contacts interface 114. The contacts interface 114 may include a listing of the user's contacts. While the contacts interface 114 lists a contact name and intelligent notification status, the contacts interface 114 may include other contact information (e.g., address, email addresses, phone numbers, etc.), which is not shown in this illustration. The contacts interface 114 may be used to turn the intelligent notifications on and off separately for each contact. Each contact may have a means for turning the intelligent notifications on and off. In this example, radio buttons 116 and 118 may be used to turn the intelligent notifications on and off for each individual contact.

For instance, in the example of FIG. 1B, the intelligent notifications are turned on 116 for the contacts listed as "Dad", "Mom" and "Steve." The intelligent notifications are turned off 118 for the contact listed as "Tom." In this manner, if Dad, Mom or Steve send communications to the user, then intelligent notifications will be used to alert the user of the incoming communication. For instance, a first communication from Dad, for whom the intelligent notifications is turned on, using a first communications mode may result in a vibration alert to the user. A second and subsequent communication from Dad using a second communications mode may result in a change of notification modes from a vibration alert to an audible alert. In contrast, all communications from Tom, for whom intelligent notifications are turned off, may provide a same alert to the user even if the communication mode changes or the frequency of the communications increases. Whereas communications from Dad, Mom and Steve may result in an escalation of alerts to the user, communications from Tom may not result in any escalation of alerts.

FIG. 1B provides merely one exemplary illustration of an interface 114 to enable the intelligent notifications to be turned on and turned off separately for each individual contact. Other interfaces that allow the intelligent notifications to be turned on and turned off separately for each individual contact are contemplated and within the scope of this disclosure.

In one exemplary implementation, the device 100 may present the user with an option to turn on the Intelligent Notification for a particular person. The device 100 may use one or more different criteria to determine whether or not to present the user with the option to turn on the Intelligent Notification for the particular person. The criteria may include the frequency of communications from a sender, a change in communications modes by the sender within a given period of time (e.g., from email message, to text message, to phone call within a given period of time), and other criteria.

For example, if the communications are received within a duration of time that is under a predetermined threshold, which may be set by the user, then the option to turn on the intelligent notification is presented. If the communications are received within a duration of time that is above the predetermined threshold, then the option to turn on intelligent notifications is not presented. When the criteria has been met for a particular sender, the device 100 may display a message to the user, which gives the user the option to turn on the Intelligent Notification for the particular sender. When presented with the option, the user may either turn on or decline to turn on the Intelligent Notification for the particular user.

In one exemplary implementation, the user of the device 100 may select the notification modes. An intelligent notification includes a change in notification mode from one notification type to a different notification type based on an identity of the sender and a change in communication modes by the same sender. The device 100 may be configurable to allow the user to set the progression of notification modes or types.

Figure 2A:
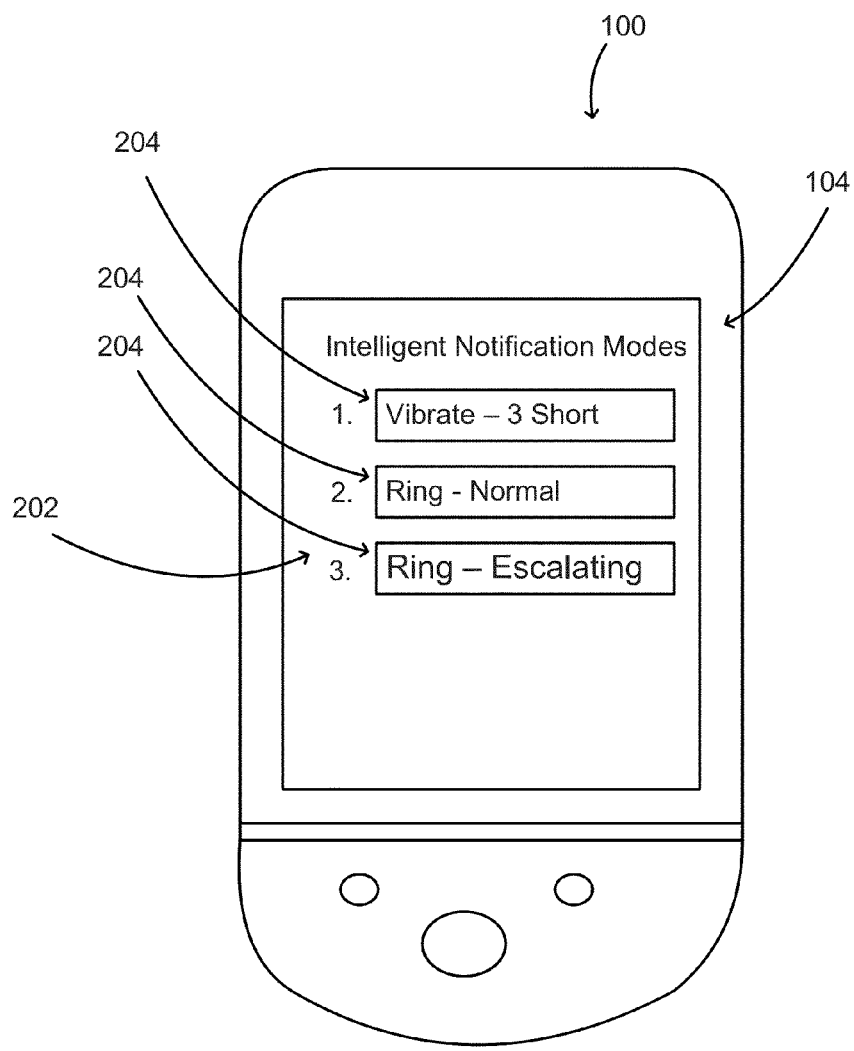
FIG. 2A is a schematic representation of an exemplary device illustrating an interface on the device for notification modes.

Referring to FIG. 2A, the device 100 may include a display 104 with an intelligent notification mode interface 202. In one exemplary implementation, the intelligent notification mode interface 202 may provide a series of menus 204 (e.g., drop down menus) with selections of different notification types from which the user may choose. The notifications may be arranged in an order of progression of notifications. For instance, the first notification to the user will be the notification type selected in the top box. The second notification to the user will be the notification type selected in the next box on the list. The third notification to the user will be the notification type selected in the third box on the list. While this example illustrates three boxes, the interface 202 may include additional selections. Also, while this example illustrates the use of drop down menus in the interface 202, other types of interfaces that allow the user to select the type of notification mode and the order of the notification may be used.

In the example of FIG. 2A, the user has selected the first notification mode to be three short vibrations. The user has selected the second notification mode to be a normal loudness ring tone. The user has selected the third notification mode to be an escalating loudness ring tone. While not illustrated here, the exact ring tone to be used also may be selected by the user whether in this interface 202 or in a different interface. In this manner, the device 100 is configured to enable the user to customize the notification modes in various different aspects.

The notification modes follow the progression of notifications listed in another exemplary implementation, the type and progression of notification modes may be pre-selected or include default settings. For instance, the device 100 may be pre-set with a default of progression of notification modes. It is to be understood that FIG. 2A is merely one example of an interface that allows the user to customize the notification modes. While the notification modes may be applied universally to the contacts designated for intelligent notifications, other techniques may be used to apply the notification modes on an individual contact basis for those contact designated for intelligent notifications.

Figure 2B:
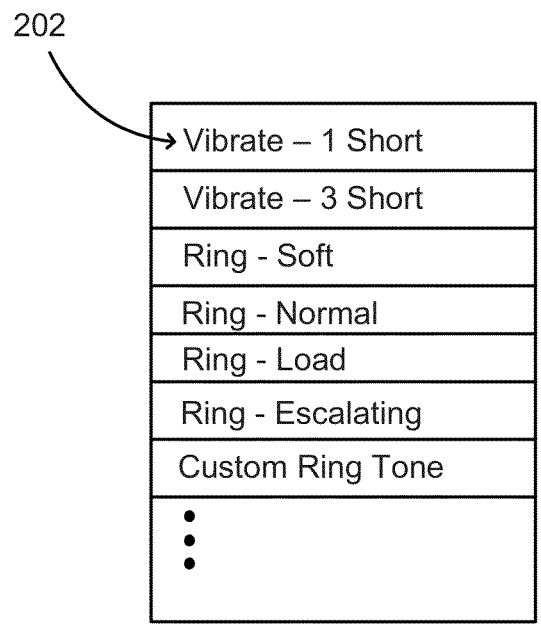
FIG. 2B is a schematic representation illustrating an exemplary menu from the interface of FIG. 2A.

Other notification modes are available. Referring to FIG. 2B, the interface 202 of FIG. 2A is illustrated as a menu. In one exemplary implementation, the menu may be a drop down menu to enable a user to select one of multiple notification modes. Interfaces other than a drop down menu are possible. In this example, the potential notification modes include vibrate —1 short, vibrate —3 short, a ring at soft volume, a ring at normal volume, a ring at loud volume, a ring at escalating volume and a custom ring tone. The listed notification modes are merely examples and other non-listed notification modes may be included. The notification modes may be audible, non-audible or a combination of audible and non-audible.

Figure 3:
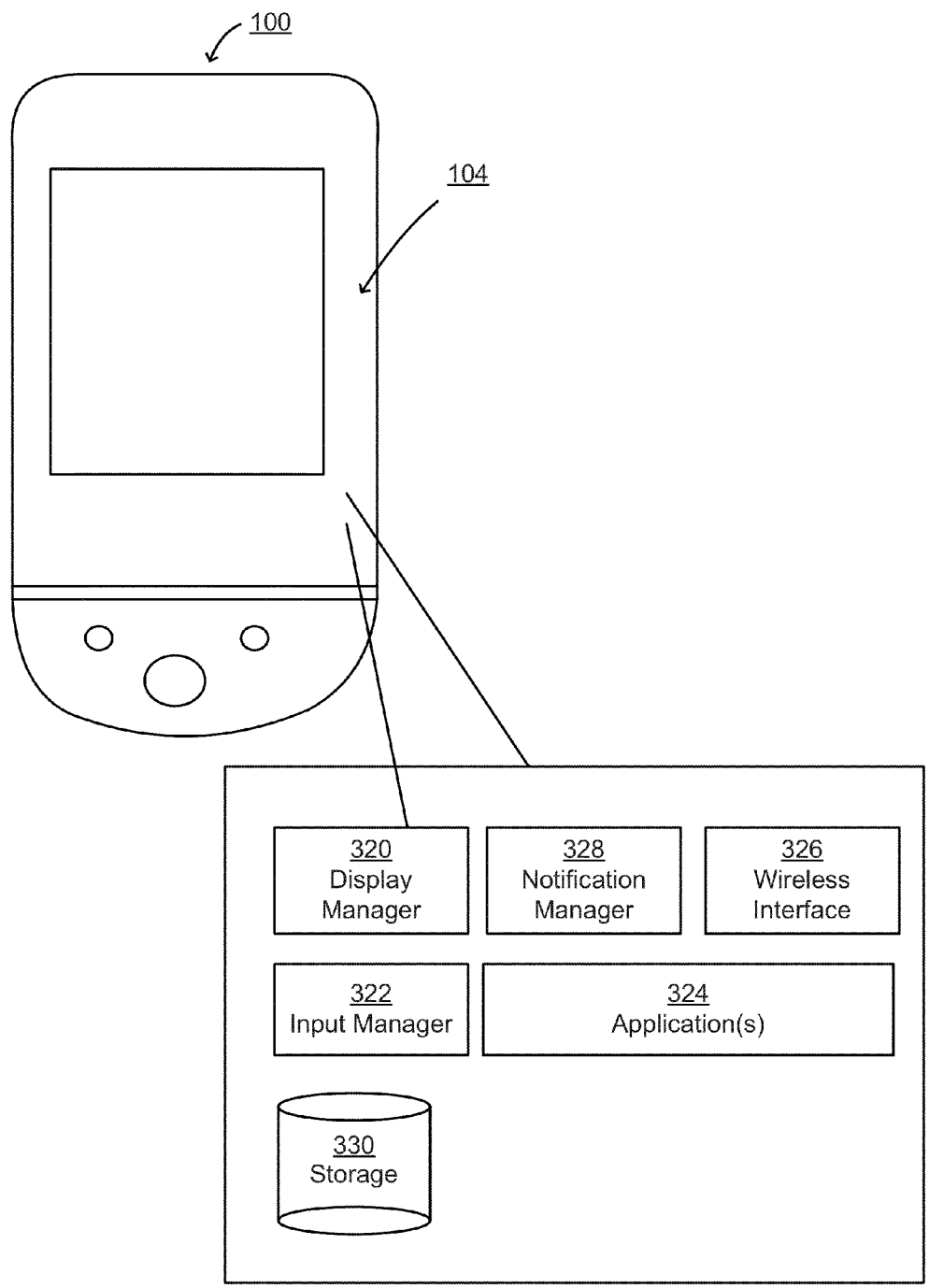
FIG. 3 is a schematic diagram illustrating exemplary components of the device of FIGS. 1A, 1B and 2A.

Referring to FIG. 3, a schematic diagram of the device 100 is illustrated. The schematic diagram illustrates components to be used for intelligent notifications. In this example, the device 100 is a mobile device having a touch screen display 104. The device 100 may also include other components to interface with the device including a trackball (not shown) and a keyboard (e.g., a slide-out keyboard) (not shown).

A number of components are shown schematically inside the device 100 to indicate components in the device, which may be associated with notification functionality for the device 100. One or more of the components may be implemented as part of a programmable microprocessor on the device 100, though the particular components are shown separately in this example for clarity of explanation.

The device 100 includes a display manager 320 to control various elements to be shown to a user on the display 104, while an input manager 322 manages inputs received from the touch-screen or other mechanisms such as a trackball or keyboard. Various applications 324 may run on the device and may provide data for graphics to be displayed through the display manager 320.

Various communications may be received over a network such as a wireless communications network connected to the internet or a cellular network, via a wireless interface 326. Information received from the network, such as from one or more remote servers, may be provided to the applications 324, and information may be passed from the applications 324 back to the network via the wireless interface 326. Information may also be passed, after processing, to a notification manager 328, which may be configured to manage notifications and notification modes regarding incoming communications.

For example, the notifications manager 328 may be configured to determine a notification mode on the device based on an identity of the sender and the communication mode for the incoming communication. The notification manager 328 may be configured to determine the notification mode based on a change in communication modes from one communication mode to another communication mode. The notification manager 328 may provide an alert or a notification to the device 100 based on the determined notification mode. For instance, if the sender of the communication is identified as a person in the Inner Circle or as a person having intelligent notifications turned on, the notification manager 328 may determine one type of notification to provide to the device

100. The notification manager 328 may change the notification mode based upon a new incoming communication from the same sender using a different communication mode. The change in communication mode from the same sender may escalate the importance of the incoming communication and cause the notification mode to be changed in accordance with the progression of intelligent notifications.

Also, the notification manager 328 may determine the notification mode based on a change in the communication modes and a period of time between the change in communication modes. For example, if the sender first sends a text message and within a short amount of time calls on the phone, then the notification mode may change. If on the other hand, the sender first sends a text message and then after a long period of time, the sender calls on the phone, then the notification mode may not change and may not follow the intelligent notification progression.

The notification manager 328 may follow one or more rules stored in a rule table that may define when to follow the intelligent notifications. The rules may be default rules or may be customizable at least in some part by the user. For example, the rules may take into account the communications modes being used for the received communications, the change from one communication mode to another communication mode, the frequency of the communications from the same sender and the period of time between communications. In one exemplary implementation, the rules may include a hierarchy of communication modes listed in order from least important to most important. A change in communication modes by the same sender from a communication mode of lower importance to a communication mode of higher importance may trigger the notification manager 328 to change the notification mode.

In one exemplary implementation, the hierarchy of communication modes may include a listing in order of importance in terms of escalating a notification mode. For instance, an email message may be the lowest importance followed by a message posted as part of a social networking application. An instant message and a text message may be next in the order of importance and a phone call may be of the highest importance. These are merely examples and other communication modes may be included in the list and the list may be arranged in a different order.

In addition, various forms of storage 330, including volatile storage and persistent storage, may be provided on the device 100. The storage 330 may store, for example, application programs and other information for operating applications on the device 100. The storage 330 also may store notification mode settings, including the intelligent notification settings including default and/or user customized settings. The storage 330 also may store tables and information related to incoming messages to track the sender of the message, the communication mode, the frequency of the communications and the time intervals between communications. The storage 330 also may store a table of rules associated with when to trigger the intelligent notifications.

Figure 4:
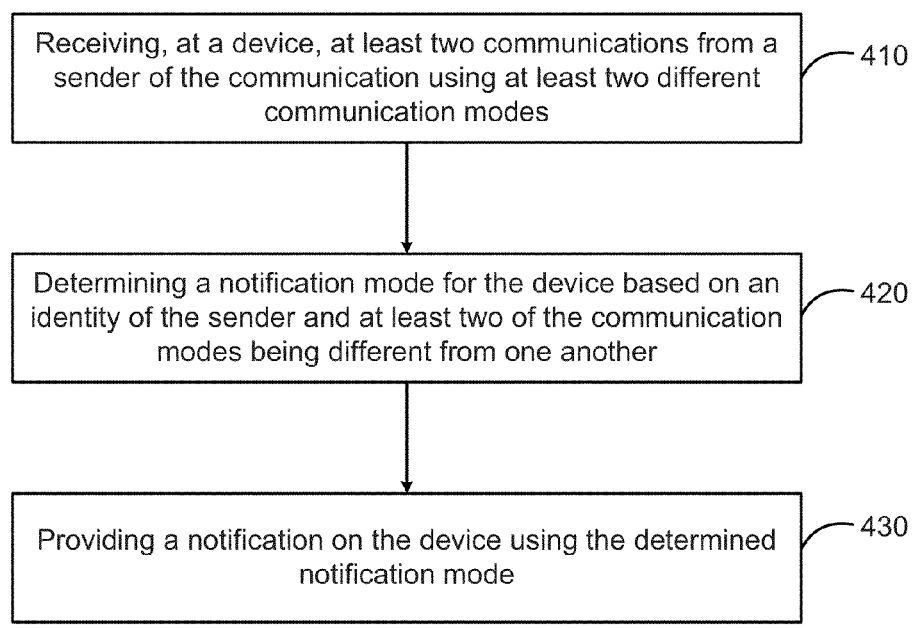
FIG. 4 is a flowchart illustrating example operations of the device of FIGS. 1A, 1B and 2A.

Referring to FIG. 4, an exemplary process 400 for notifying a user of a device of incoming communications is illustrated. Process 400 includes receiving, at a device, at least two communications from a sender of the communications using at least two different communication modes (410). For example, as discussed above, the device may be configured to receiving incoming communications via the wireless interface including multiple communications from a same sender using different communication modes.

In some implementations, the two communications are linked to a single sender by determining that the communications have an identifier that identifies a particular sender. For example, the communication can include an associated e-mail address, telephone number, user name or other identifier. Various identifiers can be associated with the particular sender, such as in the device contacts. The identifier that is received with the communication is then mapped to one of the sender's identifiers.

Process 400 also includes determining a notification mode for the device based on an identity of the sender and at least two of the communication modes being different from one another (420). For example, the notification manager may be configured to use an identity of the sender and a change from one communication mode to another communication mode to determine the notification mode on the device. The notification manager may query or use the information stored in the storage including, for example, the list of communication modes, any rules table regarding notification modes and any other tables related to intelligent notifications.

Process 400 also includes providing a notification on the device using the determined notification mode (430). For example, the notification manager may be configured to provide a notification or alert on the device using the determined notification mode. Depending on the type of alert, the device may emit an audible alert from one or more speakers or cause a non-audible to vibrate the device, for example.

Figure 5:
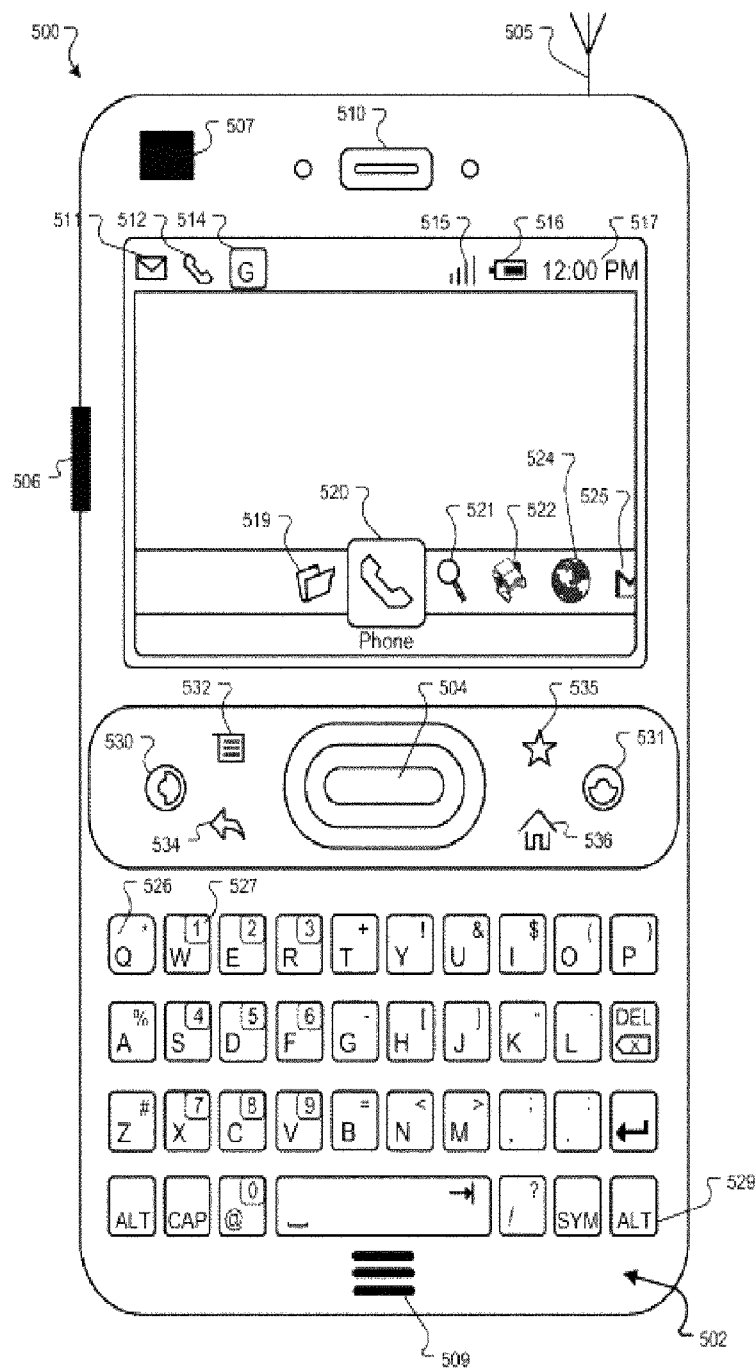
FIG. 5 is a schematic representation of an exemplary mobile device that implements embodiments of the techniques described herein.

Referring now to FIG. 5, the exterior appearance of an exemplary device 500 that implements the features described here is illustrated. Briefly, and among other things, the device 500 includes a processor configured to display notifications regarding events on the device 500, and to permit a user to conveniently "pull down" detail about the events relating to the notifications into an extended view of the events.

In more detail, the hardware environment of the device 500 includes a display 501 for displaying text, images, and video to a user; a keyboard 502 for entering text data and user commands into the device 500; a pointing device 504 for pointing, selecting, and adjusting objects displayed on the display 501; an antenna 505; a network connection 506; a camera 507; a microphone 509; and a speaker 510. Although the device 500 shows an external antenna 505, the device 500 can include an internal antenna, which is not visible to the user.

The display 501 can display video, graphics, images, and text that make up the user interface for the software applications used by the device 500, and the operating system programs used to operate the device 500. Among the possible elements that may be displayed on the display 501 are a new mail indicator 511 that alerts a user to the presence of a new message; an active call indicator 512 that indicates that a telephone call is being received, placed, or is occurring; a data standard indicator 514 that indicates the data standard currently being used by the device 500 to transmit and receive data; a signal strength indicator 515 that indicates a measurement of the strength of a signal received by via the antenna 505, such as by using signal strength bars; a battery life indicator 516 that indicates a measurement of the remaining battery life; or a clock 517 that outputs the current time.

The display 501 may also show application icons representing various applications available to the user, such as a web browser application icon 519, a phone application icon 520, a search application icon 521, a contacts application icon 522, a mapping application icon 524, an email application icon 525, or other application icons. In one example implementation, the display 501 is a quarter video graphics array (QVGA) thin film transistor (TFT) liquid crystal display (LCD), capable of 16-bit or better color.

A user uses the keyboard (or "keypad") 502 to enter commands and data to operate and control the operating system and applications that provide for responding to notification of alerts and responding to messages and the like (and also to a touch screen). The keyboard 502 includes standard keyboard buttons or keys associated with alphanumeric characters, such as keys 526 and 527 that are associated with the alphanumeric characters "Q" and "W" when selected alone, or are associated with the characters "*" and "1" when pressed in combination with key 529. A single key may also be associated with special characters or functions, including unlabeled functions, based upon the state of the operating system or applications invoked by the operating system. For example, when an application calls for the input of a numeric character, a selection of the key 527 alone may cause a "1" to be input.

In addition to keys traditionally associated with an alphanumeric keypad, the keyboard 502 also includes other special function keys, such as an establish call key 530 that causes a received call to be answered or a new call to be originated; a terminate call key 531 that causes the termination of an active call; a drop down menu key 532 that causes a menu to appear within the display 501; a backward navigation key 534 that causes a previously accessed network address to be accessed again; a favorites key 535 that causes an active web page to be placed in a bookmarks folder of favorite sites, or causes a bookmarks folder to appear; a home page key 536 that causes an application invoked on the device 500 to navigate to a predetermined network address; or other keys that provide for multiple-way navigation, application selection, and power and volume control.

The user uses the pointing device 504 to select and adjust graphics and text objects displayed on the display 501 as part of the interaction with and control of the device 500 and the applications invoked on the device 500. The pointing device 504 is any appropriate type of pointing device, and may be a joystick, a trackball, a touch-pad, a camera, a voice input device, a touch screen device implemented in combination with the display 501, or any other input device.

The antenna 505, which can be an external antenna or an internal antenna, is a directional or omni-directional antenna used for the transmission and reception of radiofrequency (RF) signals that implement point-to-point radio communication, wireless local area network (LAN) communication, or location determination. The antenna 505 may facilitate point-to-point radio communication using the Specialized Mobile Radio (SMR), cellular, or Personal Communication Service (PCS) frequency bands, and may implement the transmission of data using any number or data standards. For example, the antenna 505 may allow data to be transmitted between the device 500 and a base station using technologies such as Wireless Broadband (WiBro), Worldwide Interoperability for Microwave ACCess (WiMAX), 5GPP Long Term Evolution (LTE), Ultra Mobile Broadband (UMB), High Performance Radio Metropolitan Network (HIPERMAN), iBurst or High Capacity Spatial Division Multiple Access (HC-SDMA), High Speed OFDM Packet Access (HSOPA), High-Speed Packet Access (HSPA), HSPA Evolution, HSPA+, High Speed Upload Packet Access (HSUPA), High Speed Downlink Packet Access (HSDPA), Generic Access Network (GAN), Time Division-Synchronous Code Division Multiple Access (TD-SCDMA), Evolution-Data Optimized (or Evolution-Data Only) (EVDO), Time Division-Code Division Multiple Access (TD-CDMA), Freedom Of Mobile Multimedia Access (FOMA), Universal Mobile Telecommunications System (UMTS), Wideband Code Division Multiple Access (W-CDMA), Enhanced Data rates for GSM Evolution (EDGE), Enhanced GPRS (EGPRS), Code Division Multiple Access-2000 (CDMA2000), Wideband Integrated Dispatch Enhanced Network (WiDEN), High-Speed Circuit-Switched Data (HSCSD), General Packet Radio Service (GPRS), Personal Handy-Phone System (PHS), Circuit Switched Data (CSD), Personal Digital Cellular (PDC), CDMAone, Digital Advanced Mobile Phone System (D-AMPS), Integrated Digital Enhanced Network (IDEN), Global System for Mobile communications (GSM), DataTAC, Mobitex, Cellular Digital Packet Data (CDPD), Hicap, Advanced Mobile Phone System (AMPS), Nordic Mobile Phone (NMP), Autoradiopuhelin (ARP), Autotel or Public Automated Land Mobile (PALM), Mobiltelefonisystem D (MTD), Offentlig Landmobil Telefoni (OLT), Advanced Mobile Telephone System (AMTS), Improved Mobile Telephone Service (IMTS), Mobile Telephone System (MTS), Push-To-Talk (PTT), or other technologies. Communication via W-CDMA, HSUPA, GSM, GPRS, and EDGE networks may occur, for example, using a QUALCOMM MSM7200A chipset with an QUALCOMM RTR6285™ transceiver and PM7540™ power management circuit.

The wireless or wired computer network connection 506 may be a modem connection, a local-area network (LAN) connection including the Ethernet, or a broadband wide-area network (WAN) connection such as a digital subscriber line (DSL), cable high-speed internet connection, dial-up connection, T-1 line, T-3 line, fiber optic connection, or satellite connection. The network connection 506 may connect to a LAN network, a corporate or government WAN network, the Internet, a telephone network, or other network. The network connection 506 uses a wired or wireless connector. Example wireless connectors include, for example, an INFRARED DATA ASSOCIATION (IrDA) wireless connector, a Wi-Fi wireless connector, an optical wireless connector, an INSTITUTE OF ELECTRICAL AND ELECTRONICS ENGINEERS (IEEE) Standard 802.11 wireless connector, a BLUETOOTH wireless connector (such as a BLUETOOTH version 1.2 or 5.0 connector), a near field communications (NFC) connector, an orthogonal frequency division multiplexing (OFDM) ultra wide band (UWB) wireless connector, a time-modulated ultra wide band (TM-UWB) wireless connector, or other wireless connector. Example wired connectors include, for example, a IEEE-1394 FIREWIRE connector, a Universal Serial Bus (USB) connector (including a mini-B USB interface connector), a serial port connector, a parallel port connector, or other wired connector. In another implementation, the functions of the network connection 506 and the antenna 505 are integrated into a single component.

The camera 507 allows the device 500 to capture digital images, and may be a scanner, a digital still camera, a digital video camera, other digital input device. In one example implementation, the camera 507 is a 5 mega-pixel (MP) camera that utilizes a complementary metal-oxide semiconductor (CMOS).

The microphone 509 allows the device 500 to capture sound, and may be an omni-directional microphone, a unidirectional microphone, a bidirectional microphone, a shotgun microphone, or other type of apparatus that converts sound to an electrical signal. The microphone 509 may be used to capture sound generated by a user, for example when the user is speaking to another user during a telephone call via the device 500. Conversely, the speaker 510 allows the device to convert an electrical signal into sound, such as a voice from another user generated by a telephone application program, or a ring tone generated from a ring tone application program. Furthermore, although the device 500 is illustrated in FIG. 5 as a handheld device, in further implementations the device 500 may be a laptop, a workstation, a midrange computer, a mainframe, an embedded system, telephone, desktop PC, a tablet computer, a PDA, or other type of computing device.

Figure 6:
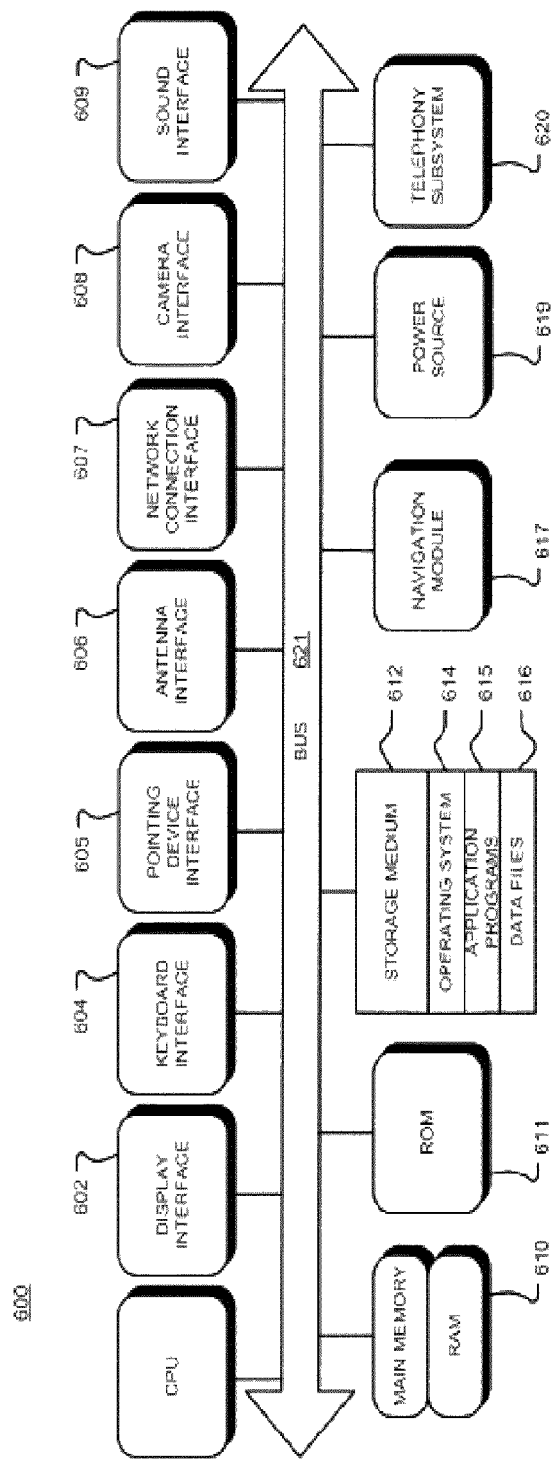
FIG. 6 is a block diagram illustrating the internal architecture of the device of FIG. 5.

FIG. 6 is a block diagram illustrating an internal architecture 600 of the device 500. The architecture includes a central processing unit (CPU) 601 where the computer instructions that comprise an operating system or an application are processed; a display interface 602 that provides a communication interface and processing functions for rendering video, graphics, images, and texts on the display 501, provides a set of built-in controls (such as buttons, text and lists), and supports diverse screen sizes; a keyboard interface 604 that provides a communication interface to the keyboard 502; a pointing device interface 605 that provides a communication interface to the pointing device 504; an antenna interface 606 that provides a communication interface to the antenna 505; a network connection interface 607 that provides a communication interface to a network over the computer network connection 506; a camera interface 608 that provides a communication interface and processing functions for capturing digital images from the camera 507; a sound interface 609 that provides a communication interface for converting sound into electrical signals using the microphone 509 and for converting electrical signals into sound using the speaker 510; a random access memory (RAM) 610 where computer instructions and data are stored in a volatile memory device for processing by the CPU 601; a read-only memory (ROM) 611 where invariant low-level systems code or data for basic system functions such as basic input and output (I/O), startup, or reception of keystrokes from the keyboard 502 are stored in a non-volatile memory device; a storage medium 612 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files that comprise an operating system 614, application programs 615 (including, for example, a web browser application, a widget or gadget engine, and or other applications, as necessary) and data files 616 are stored; a navigation module 617 that provides a real-world or relative position or geographic location of the device 500; a power source 619 that provides an appropriate alternating current (AC) or direct current (DC) to power components; and a telephony subsystem 620 that allows the device 500 to transmit and receive sound over a telephone network. The constituent devices and the CPU 601 communicate with each other over a bus 621.

The CPU 601 can be one of a number of computer processors. In one arrangement, the computer CPU 601 is more than one processing unit. The RAM 610 interfaces with the computer bus 621 so as to provide quick RAM storage to the CPU 601 during the execution of software programs such as the operating system application programs, and device drivers. More specifically, the CPU 601 loads computer-executable process steps from the storage medium 612 or other media into a field of the RAM 610 in order to execute software programs. Data is stored in the RAM 610, where the data is accessed by the computer CPU 601 during execution. In one example configuration, the device 500 includes at least 128 MB of RAM, and 256 MB of flash memory.

The storage medium 612 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 500 to access computer-executable process steps, application programs and the like, stored on removable and non-removable memory media, to off-load data from the device 500, or to upload data onto the device 500.

A computer program product is tangibly embodied in storage medium 612, a machine-readable storage medium. The computer program product includes instructions that, when read by a machine, operate to cause a data processing apparatus to store image data in the mobile device. In some embodiments, the computer program product includes instructions that generate notifications about alerts such as newly arriving messages on the device.

The operating system 614 may be a LINUX-based operating system such as the GOOGLE mobile device platform; APPLE MAC OS X; MICROSOFT WINDOWS NT/WINDOWS 2000/WINDOWS XP/WINDOWS MOBILE; a variety of UNIX-flavored operating systems; or a proprietary operating system for computers or embedded systems. The application development platform or framework for the operating system 614 may be: BINARY RUNTIME ENVIRONMENT FOR WIRELESS (BREW); JAVA Platform, Micro Edition (JAVA ME) or JAVA 2 Platform, Micro Edition (J2ME) using the SUN MICROSYSTEMS JAVASCRIPT programming language; PYTHON FLASH LITE, or MICROSOFT .NET Compact, or another appropriate environment.

The device stores computer-executable code for the operating system 614, and the application programs 615 such as an email, instant messaging, a video service application, a mapping application word processing, spreadsheet, presentation, gaming, mapping, web browsing, JAVASCRIPT engine, or other applications. For example, one implementation may allow a user to access the GOOGLE GMAIL email application, the GOOGLE TALK instant messaging application, a YOUTUBE video service application, a GOOGLE MAPS or GOOGLE EARTH mapping application, or a GOOGLE PICASA imaging editing and presentation application. The application programs 615 may also include a widget or gadget engine, such as a TAFRI widget engine, a MICROSOFT gadget engine such as the WINDOWS SIDEBAR gadget engine or the KAPSULES gadget engine, a YAHOO! widget engine such as the KONFABULTOR widget engine, the APPLE DASHBOARD widget engine, the GOOGLE gadget engine, the KLIPFOLIO widget engine, an OPERA widget engine, the WIDSETS widget engine, a proprietary widget or gadget engine, or other widget or gadget engine the provides host system software for a physically-inspired applet on a desktop.

Although it is possible to provide for notifications and interactions with messages and other events using the above-described implementation, it is also possible to implement the functions according to the present disclosure as a dynamic link library (DLL), or as a plug-in to other application programs such as an Internet web-browser such as the FOXFIRE web browser, the APPLE SAFARI web browser or the MICROSOFT INTERNET EXPLORER web browser.

The navigation module 617 may determine an absolute or relative position of the device, such as by using the Global Positioning System (GPS) signals, the GLObal NAvigation Satellite System (GLONASS), the Galileo positioning system, the Beidou Satellite Navigation and Positioning System, an inertial navigation system, a dead reckoning system, or by accessing address, internet protocol (IP) address, or location information in a database. The navigation module 617 may also be used to measure angular displacement, orientation, or velocity of the device 500, such as by using one or more accelerometers.

Figure 7:
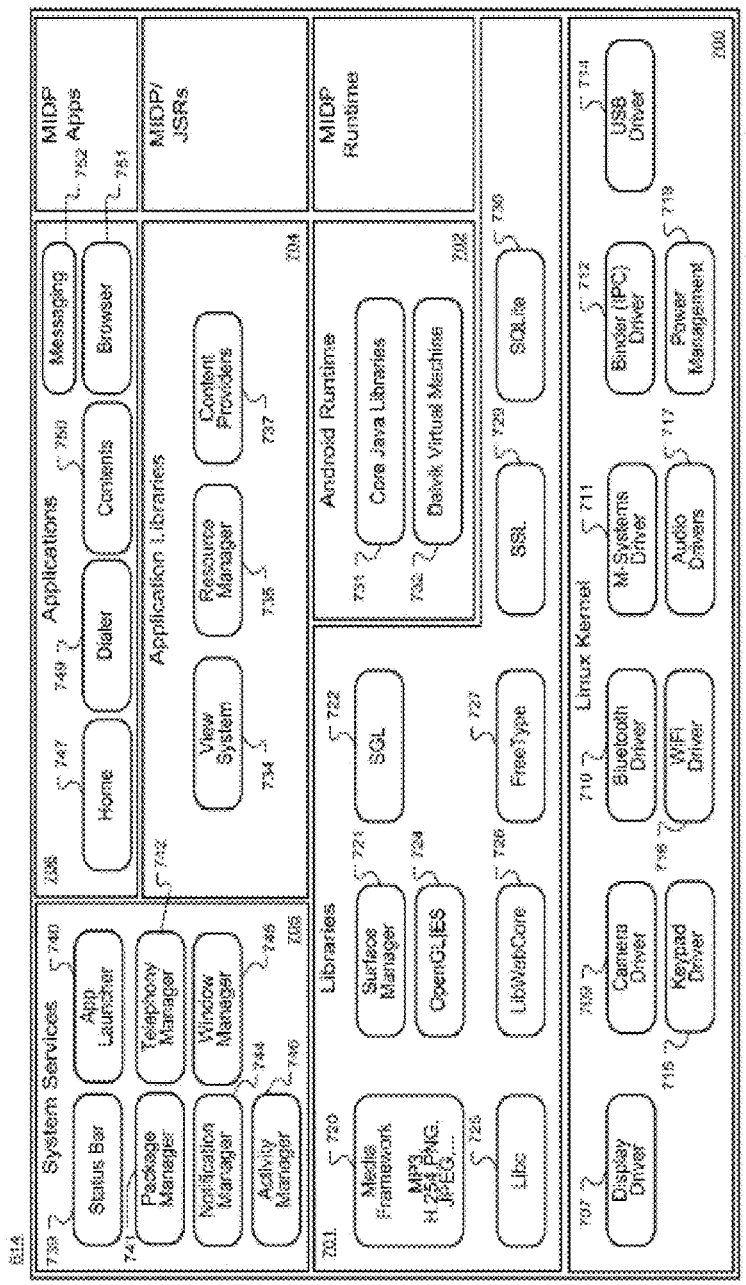
FIG. 7 is a block diagram illustrating exemplary components of the operating system used by the device of FIG. 5.

FIG. 7 is a block diagram illustrating exemplary components of the operating system 614 used by the device 500, in the case where the operating system 614 is the GOOGLE mobile device platform. The operating system 614 invokes multiple processes, while ensuring that the associated phone application is responsive, and that wayward applications do not cause a fault (or "crash") of the operating system. Using task switching, the operating system 614 allows for the switching of applications while on a telephone call, without losing the state of each associated application. The operating system 614 may use an application framework to encourage reuse of components, and provide a scalable user experience by combining pointing device and keyboard inputs and by allowing for pivoting. Thus, the operating system can provide a rich graphics system and media experience, while using an advanced, standards-based web browser.

The operating system 614 can generally be organized into six components: a kernel 700, libraries 701, an operating system runtime 702, application libraries 704, system services 705, and applications 706. The kernel 700 includes a display driver 707 that allows software such as the operating system 614 and the application programs 715 to interact with the display 501 via the display interface 602, a camera driver 709 that allows the software to interact with the camera 507; a BLUETOOTH driver 710; a M-Systems driver 711; a binder (IPC) driver 712, a USB driver 714 a keypad driver 715 that allows the software to interact with the keyboard 502 via the keyboard interface 604; a WiFi driver 716; audio drivers 717 that allow the software to interact with the microphone 509 and the speaker 510 via the sound interface 609; and a power management component 719 that allows the software to interact with and manage the power source 719.

The BLUETOOTH driver, which in one implementation is based on the BlueZ BLUETOOTH stack for LINUX-based operating systems, provides profile support for headsets and hands-free devices, dial-up networking, personal area networking (PAN), or audio streaming (such as by Advance Audio Distribution Profile (A2DP) or AudioNideo Remote Control Profile (AVRCP). The BLUETOOTH driver provides JAVA bindings for scanning, pairing and unpairing, and service queries.

The libraries 701 include a media framework 720 that supports standard video, audio and still-frame formats (such as Moving Picture Experts Group (MPEG)-4, H.264, MPEG-1 Audio Layer-3 (MP3), Advanced Audio Coding (MC), Adaptive Multi-Rate (AMR), Joint Photographic Experts Group (JPEG), and others) using an efficient JAVA Application Programming Interface (API) layer; a surface manager 721; a simple graphics library (SGL) 722 for two-dimensional application drawing; an Open Graphics Library for Embedded Systems (OpenGL ES) 724 for gaming and three-dimensional rendering; a C standard library (LIBC) 725; a LIBWEBCORE library 726; a FreeType library 727; an SSL 729; and an SQLite library 730.

The operating system runtime 702 includes core JAVA libraries 731, and a Dalvik virtual machine 732. The Dalvik virtual machine 732 is a custom, virtual machine that runs a customized file format (.DEX).

The operating system 614 can also include Mobile Information Device Profile (MIDP) components such as the MIDP JAVA Specification Requests (JSRs) components, MIDP runtime, and MIDP applications as shown in FIG. 7. The MIDP components can support MIDP applications running on the device 500.

With regard to graphics rendering, a system-wide composer manages surfaces and a frame buffer and handles window transitions, using the OpenGL ES 724 and two-dimensional hardware accelerators for its compositions.

The Dalvik virtual machine 732 may be used with an embedded environment, since it uses runtime memory very efficiently, implements a CPU-optimized bytecode interpreter, and supports multiple virtual machine processes per device. The custom file format (.DEX) is designed for runtime efficiency, using a shared constant pool to reduce memory, read-only structures to improve cross-process sharing, concise, and fixed-width instructions to reduce parse time, thereby allowing installed applications to be translated into the custom file formal at build-time. The associated bytecodes are designed for quick interpretation, since register-based instead of stack-based instructions reduce memory and dispatch overhead, since using fixed width instructions simplifies parsing, and since the 16-bit code units minimize reads.

The application libraries 704 include a view system 734, a resource manager 735, and content providers 737. The system services 705 includes a status bar 739; an application launcher 740; a package manager 741 that maintains information for all installed applications; a telephony manager 742 that provides an application level JAVA interface to the telephony subsystem 620; a notification manager 744 that allows all applications access to the status bar and on-screen notifications, such as in the manners discussed in the embodiments above; a window manager 745 that allows multiple applications with multiple windows to share the display 501; and an activity manager 746 that runs each application in a separate process, manages an application life cycle, and maintains a cross-application history.

The applications 706 include a home application 747, a dialer application 749, a contacts application 750, a browser application 751, and a messaging application 752. The messaging application 752 may receive and send messages by a number of mechanisms such as e-mail, voice mail, and text message, and may interaction with the notification manager 744 to alert a user when new messages arrive.

The telephony manager 742 provides event notifications (such as phone state, network state, Subscriber Identity Module (SIM) status, or voicemail status), allows access to state information (such as network information, SIM information, or voicemail presence), initiates calls, and queries and controls the call state. The browser application 751 renders web pages in a full, desktop-like manager, including navigation functions. Furthermore, the browser application 751 allows single column, small screen rendering, and provides for the embedding of HTML views into other applications.

Figure 8:
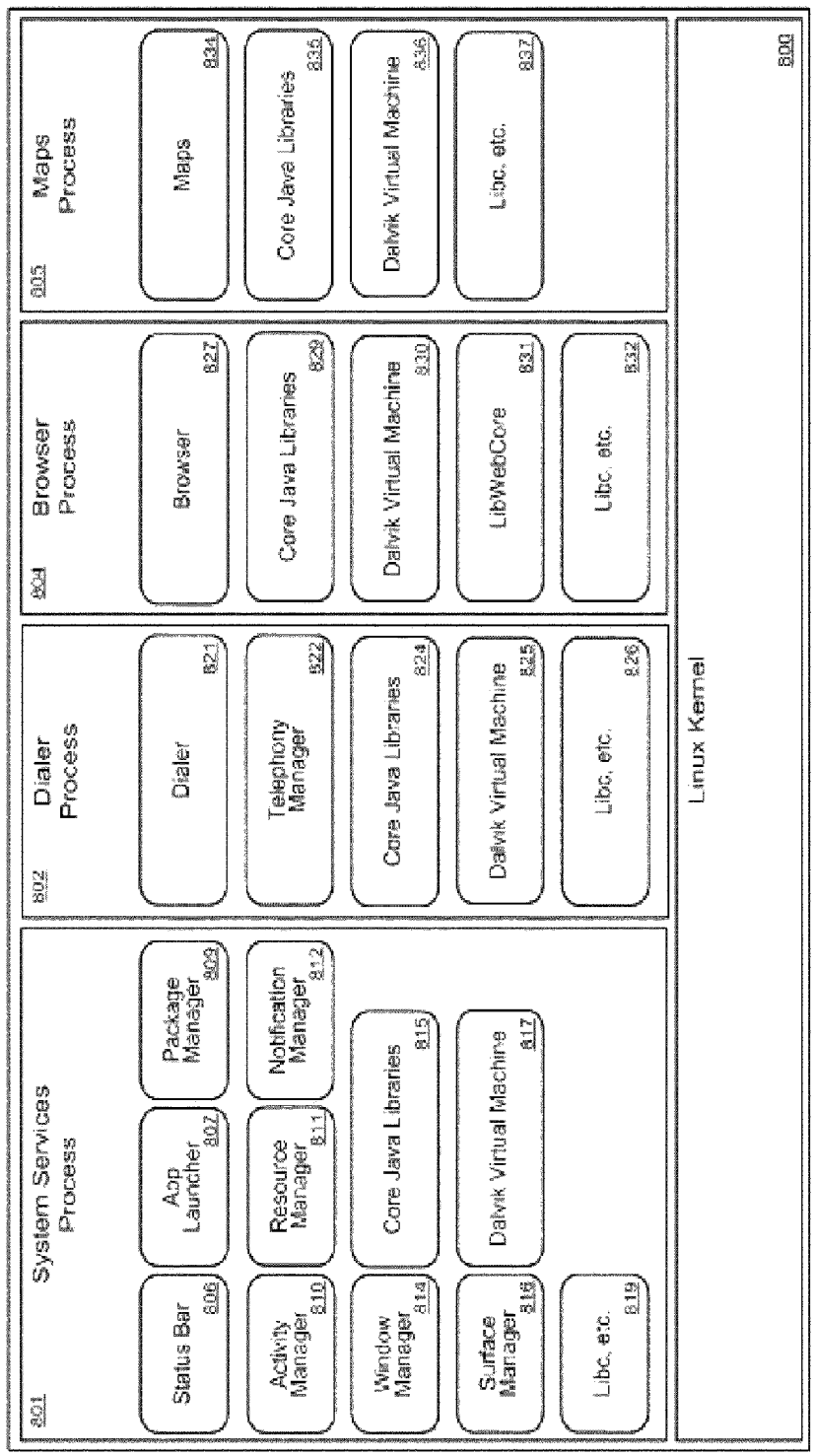
FIG. 8 is a block diagram illustrating exemplary processes implemented by the operating system kernel of FIG. 7.

FIG. 8 is a block diagram illustrating exemplary processes implemented by the operating system kernel 800. Generally, applications and system services run in separate processes, where the activity manager 746 runs each application in a separate process and manages the application life cycle. The applications run in their own processes, although many activities or services can also run in the same process. Processes are started and stopped as needed to run an application's components, and processes may be terminated to reclaim resources. Each application is assigned its own process, whose name is the application's package name, and individual parts of an application can be assigned another process name.

Some processes can be persistent. For example, processes associated with core system components such as the surface manager 816, the window manager 814, or the activity manager 810 can be continuously executed while the device 500 is powered. Additionally, some application-specific process can also be persistent. For example, processes associated with the dialer application 821, may also be persistent.

The processes implemented by the operating system kernel 800 may generally be categorized as system services processes 801, dialer processes 802, browser processes 804, and maps processes 805. The system services processes 801 include status bar processes 806 associated with the status bar 739; application launcher processes 807 associated with the application launcher 740; package manager processes 809 associated with the package manager 741; activity manager processes 810 associated with the activity manager 746; resource manager processes 811 associated with a resource manager 811 that provides access to graphics, localized strings, and XML layout descriptions; notification manager processes 812 associated with the notification manager 744; window manager processes 814 associated with the window manager 745; core JAVA libraries processes 815 associated with the core JAVA libraries 731; surface manager processes 816 associated with the surface manager 721; Dalvik virtual machine processes 817 associated with the Dalvik virtual machine 732, and LIBC processes 819 associated with the LIBC library 725.

The dialer processes 802 include dialer application processes 821 associated with the dialer application 749; telephony manager processes 822 associated with the telephony manager 742; core JAVA libraries processes 824 associated with the core JAVA libraries 731; Dalvik virtual machine processes 825 associated with the Dalvik Virtual machine 732; and LIBC processes 826 associated with the LIBC library 725. The browser processes 804 include browser application processes 827 associated with the browser application 751; core JAVA libraries processes 829 associated with the core JAVA libraries 731; Dalvik virtual machine processes 830 associated with the Dalvik virtual machine 732; LIBWEBCORE processes 831 associated with the LIBWEBCORE library 726; and LIBC processes 832 associated with the LIBC library 725.

The maps processes 805 include maps application processes 834, core JAVA libraries processes 835, Dalvik virtual machine processes 836, and LIBC processes 837. Notably, some processes, such as the Dalvik virtual machine processes, may exist within one or more of the systems services processes 801, the dialer processes 802, the browser processes 804, and the maps processes 805.

Figure 9:
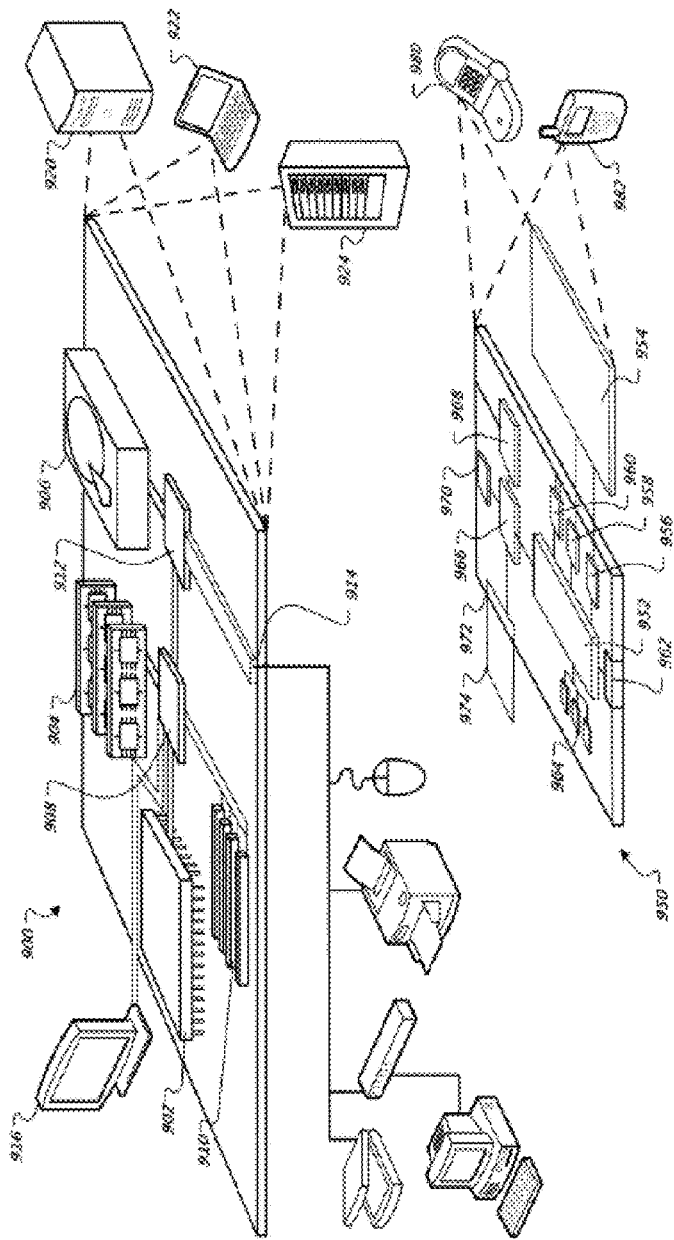
FIG. 9 shows an example of a computer device and a mobile computer device that can be used to implement the techniques described here.

FIG. 9 shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, memory on processor 902, or a propagated signal.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952,

964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, memory on processor 952, or a propagated signal that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network).

Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has been described with respect to television advertisements, but other forms of future, viewership-based advertisements may also be addressed, such as radio advertisements and on-line video advertisements.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:
   receiving, at a device and using at least two different communication modes, at least two communications from a sender of at least two communications;
   determining a notification mode for the device based at least in part on an identity of the sender and on an amount of time elapsed between receipt of each of the at least two communications;
   providing, by the device and at a particular frequency, one or more instances of a notification using the determined notification mode; and
   increasing the particular frequency at which the notification is provided by the device using the determined notification mode, wherein increasing the frequency comprises reducing an amount of time elapsed between subsequent instances of providing the notification.

2. The method as in claim 1 wherein determining the notification mode comprises determining the notification mode for the device based also on a period of time between a change of communication mode.

3. The method as in claim 1, wherein
   determining the notification mode comprises changing the notification mode from a non-audible notification mode, and
   wherein providing the notification comprises providing an audible notification using an audible notification mode.

4. The method as in claim 1 wherein determining the notification mode comprises determining the notification mode for the device based also on an importance group associated with the sender.

5. The method as in claim 1 further comprising allowing a user of the device to configure the notification mode.

6. A recordable non-transitory storage medium having recorded and stored thereon instructions that, when executed, perform the actions of:
   receiving, at a device and using at least two different communication modes, at least two communications from a sender of at least two communications;
   determining a notification mode for the device based at least in part on an identity of the sender and on an amount of time elapsed between receipt of each of the at least two communications;
   providing, at a particular frequency, one or more instances of a notification using the determined notification mode; and
   increasing the particular frequency at which the notification that is provided using the determined notification mode, wherein increasing the frequency comprises reducing an amount of time elapsed between subsequent instances of providing the notification.

7. The recordable non-transitory storage medium of claim 6 wherein the instructions that, when executed, perform the action of determining the notification mode comprise instructions that, when executed, perform the action of determining the notification mode for the device based also on a period of time between a change of in the communication mode.

8. The recordable non-transitory storage medium of claim 6, wherein
   the instructions that, when executed, perform the action of determining the notification mode comprise instructions that, when executed, perform the action of changing the notification mode from a non-audible notification mode, and
   the instructions that, when executed, perform the action of providing the notification comprise instructions that, when executed, perform the action of providing an audible notification using an audible notification mode.

9. The recordable non-transitory storage medium of claim 6 wherein the instructions that, when executed, perform the action of determining the notification mode comprise instructions that, when executed, perform the action of determining the notification mode for the device based also an importance group associated with the sender.

10. The recordable non-transitory storage medium of claim 6 further comprising instructions that, when executed, perform the action of allowing a user of the device to configure the notification mode.

11. An apparatus, comprising:
    a processor;
    a memory that is operably coupled to the processor;
    a wireless interface that is operably coupled to the processor and that is arranged and configured to receive, at the apparatus and using at least two different communication modes, at least two communications from a sender of at least two communications; and
    a notification manager that is operably coupled to the processor and that is arranged and configured to:
        determine a notification mode for the device based at least in part on an identity of the sender and on an amount of time elapsed between receipt of each of the at least two communications;
        provide, at a particular frequency, one or more instances of a notification using the determined notification mode; and
        increase the particular frequency at which the notification that is provided using the determined notification mode, wherein increasing the frequency comprises reducing an amount of time elapsed between subsequent instances of the notification.

12. The apparatus of claim 11 wherein the notification manager is arranged and configured to determine the notification mode for the device based also on a period of time between a change of communication mode.

13. The apparatus of claim 11 wherein the notification manager is arranged and configured to:
    change the notification mode from a non-audible notification mode; and
    provide an audible notification using an audible notification mode.

14. The apparatus of claim 11 wherein the notification manager is arranged and configured to determine the notification mode based also on an importance group associated with the sender.

15. The apparatus of claim 11 further comprising an input interface that is operably coupled to the processor and that is arranged and configured to allow a user of the device to configure the notification mode.

* * * * *